Figure 4:
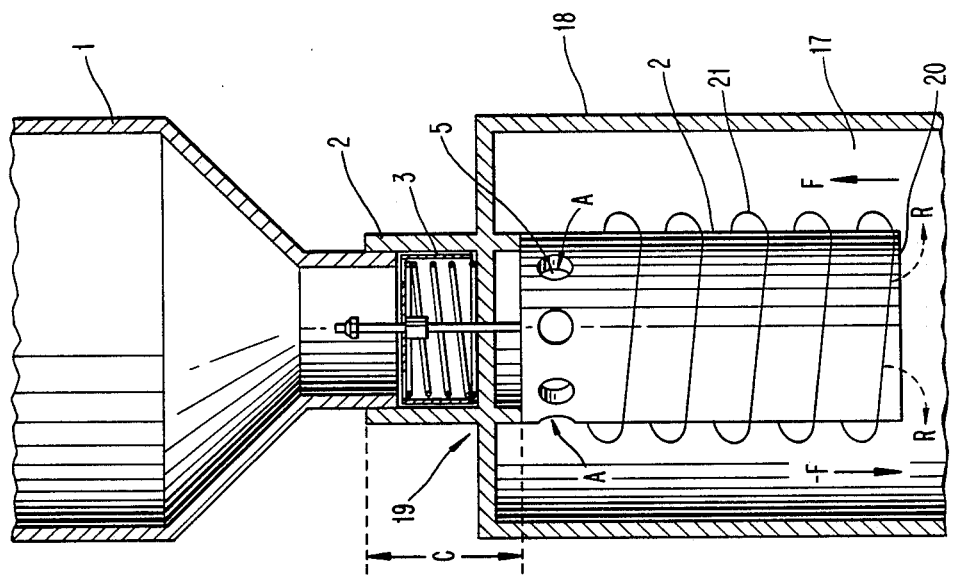

United States Patent [19]

Mariotti

[11] Patent Number: 4,870,985
[45] Date of Patent: Oct. 3, 1989

[54] FLOW CONTROL VALVE

[75] Inventor: Rene Mariotti, Saint Cloud, France

[73] Assignee: Ore-Ida Vended Products, Inc., Boise, Id.

[21] Appl. No.: 267,648

[22] Filed: Nov. 4, 1988

Related U.S. Application Data

[63] Continuation of Ser. No. 927,481, Nov. 6, 1986, abandoned.

[30] Foreign Application Priority Data

Nov. 8, 1985 [FR] France ................... 85 16548

[51] Int. Cl.$^4$ .............................................. A47J 37/12
[52] U.S. Cl. ...................................... 137/102; 99/403;
219/438
[58] Field of Search ......................... 99/403; 137/102;
219/438

[56] References Cited

U.S. PATENT DOCUMENTS

| | | |
|---|---|---|
| 2,287,396 | 6/1942 | Roth . |
| 2,347,204 | 4/1944 | Lindsay . |
| 3,070,112 | 12/1962 | Fricke et al. . |
| 3,210,193 | 10/1965 | Martin ............... 99/403 X |
| 3,410,199 | 11/1968 | Quednau ............... 99/403 |
| 3,431,835 | 3/1969 | Angold ............... 99/403 X |
| 3,608,472 | 9/1971 | Felster et al. . |
| 3,649,290 | 3/1972 | Angold . |
| 3,655,411 | 4/1972 | Albright . |
| 3,734,744 | 5/1973 | Albright . |
| 3,793,940 | 2/1974 | Albright et al. . |
| 3,853,044 | 12/1974 | Albright et al. . |
| 3,861,286 | 1/1975 | Albright et al. . |
| 4,110,481 | 8/1978 | Albright et al. . |
| 4,502,372 | 3/1985 | Mariotti . |
| 4,505,193 | 3/1985 | Mariotti . |
| 4,590,361 | 5/1986 | Del Fabbro ............... 219/438 X |

FOREIGN PATENT DOCUMENTS

| | | |
|---|---|---|
| 0000012 | 12/1978 | European Pat. Off. . |
| 2166836 | 8/1973 | France . |
| WO85/05703 | 12/1985 | PCT Int'l Appl. . |
| 364951 | 11/1962 | Switzerland . |

Primary Examiner—Robert G. Nilson
Attorney, Agent, or Firm—Burns, Doane, Swecker & Mathis

[57] ABSTRACT

A flow control valve is provided having a system of cup valves (3, 4) and a mushroom valve (6) mounted on a sliding rod (8), which valves alternately close one or more passages (5) admitting fluid in a first condition and an outlet passage (7) for the fluid in a second condition. The invention is applicable, among other things, to the feeding of a frying tank with hot oil followed by discharge of the oil cooled by the heat exchange with the foods to be fried, without a significant mixing between the hot stream and the cooled stream.

12 Claims, 2 Drawing Sheets

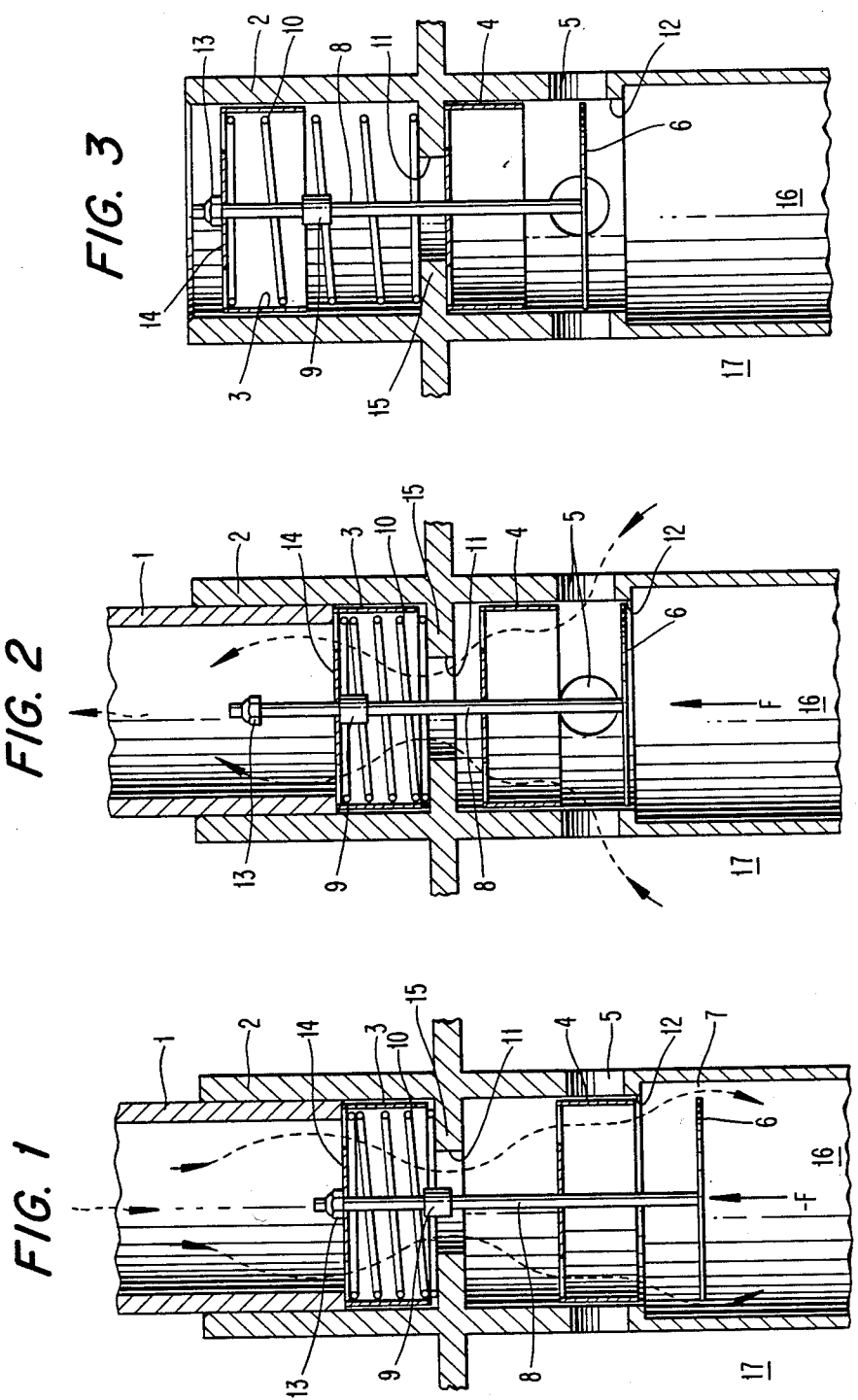

FLOW CONTROL VALVE

This application is a continuation of application Ser. No. 927,481 filed Nov. 6, 1986, now abandoned.

The present invention relates to a flow control valve inserted in a closed circuit for the flow of a fluid likely to be at two different temperatures comprising on the one hand a flow tube having at least one admission orifice of said fluid at a first temperature, for example hot, from a reservoir towards a receiver where the temperature variation occurs and at least one return passage of said fluid at its second temperature for example cold, from the receiver towards the reservoir where an inverse temperature variation occurs, and on the other hand first means adapted to close off the return passage or passages while the admission orifice or orifices are open and second means adapted to close off said admission orifice or orifices whilst said return passage or passages are open.

The invention is applicable in particular to an industrial frying apparatus such as described in the French Pat. No. 2 501 491 in the name of the applicant.

In such an apparatus, a buffer zone is provided in which the oil, intended to be fed as required into the frying tank, which will be called hereafter frying head, is kept at the ideal frying temperature. When this oil is in the frying head, in a few seconds it loses a great part of its heat to the food to be fried. This oil is then removed from the frying head and brought back into a reservoir which feeds the buffer zone, while however preventing the cooled oil from being mixed with the hot oil waiting for the next frying operation.

To this end, in the prior technique, the oil follows two different channels.

The purpose of the present invention is to simplify the existing structure by providing a valve which allows only a single channel to be used without the cooled oil mixing significantly with the waiting hot oil.

This valve allows the frying apparatus to operate without discontinuity and without requiring excessive heating means which "crack" the oil.

The desired aim is reached in that the flow tube is immersed in the reservoir and in that the return passage or passages open into the reservoir at a substantial distance from the admission orifices whereby no appreciable mixing occurs between the oil at its first temperature ready to be admitted into the receiver and the oil at its second temperature returned from the receiver.

According to the invention the flow tube has a common section for both the admission and return flows downstream of the admission orifice or orifices or in the direction of the admission of the fluid.

In a practical embodiment of the invention, said admission orifice or orifices are formed in the wall of the flow tube and said return passage is formed by a space left free between a section of the tube itself and a mushroom valve movable in the tube and adapted for cooperating with a narrowed portion of said section so as to close said return passage, said mushroom valve thus forming said first closure means.

The second closure means are formed by a first sliding valve in the form of a cup with perforated bottom, said first cup valve being oriented so that its bottom is always downstream of the fluid admission orifice or orifices, seen in the direction of the admission of the fluid at its first temperature, and whose peripheral wall is coaxial to said tube, said wall being capable of closing the admission orifice or orifices.

In a preferred embodiment of the invention, the mushroom valve and the first cup valve are integral with a sliding rod coaxial to said tube, the stroke of said rod being limited by two stops mounted on said rod and situated on each side of a plate adapted for being held immobile in said tube and through which said rod passes, the rod/first cup valve/mushroom valve assembly occupying in a so-called normal situation, a position such that the return passage is open whereas the admission orifice or orifices are closed, and being brought into a position such that the return passage is closed whereas the admission orifice or orifices are open under the effect of the pressure exerted on the mushroom valve in the direction of the narrowed portion of the tube.

This pressure is exerted by the oil when it is driven back to wards the frying head.

In a practical embodiment of the invention, the tube is vertical and the return passage is situated lower than the admission orifice or orifices, the rod/first cup valve/mushroom valve assembly occupying said normal situation by simple gravity.

However, the rod/first cup valve/mushroom valve return to their normal situation, from their closure position of the return passage, under the effect of a depression exerted on the valve in a direction opposite the above mentioned pressure.

Advantageously, the plate on each side of which are mounted the stops limiting the stroke of the sliding rod, is formed by the perforated bottom of a second cup valve similar to the first one and oriented silimarly, said cup valve being immobilized, against the force of a spring, between an internal annular narrowed portion provided in said tube and a removable piece extractable from the tube.

The second cup valve is mounted for sliding on the rod and, in the absence of the extractable removable piece, the spring expands driving the second cup valve, the rod, the first cup valve and a mushroom valve until the bottom of the first cup valve comes into abutment against the internal annular narrowed portion of the tube while closing the central passage left vacant by said narrow portion.

The removable extractable piece in question is, in the application considered, a cylindrical frying tank sliding in said tube. Thus, the frying head is removable, which facilitates cleaning. When it is removed from the tube, the passage left vacant by the narrowed portion is immediately closed by the bottom of the first cup valve, which prevents the boiling oil from being projected outwardly if the staff servicing the machine makes a false manoeuver.

The present invention also relates to the application of the above described valve to supplying a frying tank with hot oil followed by discharge of the oil cooled by heat exchange with the foods to be fried, without any significant mixing between the hot stream and the cold stream.

The invention is described hereafter in greater detail, with reference to the accompanying drawings in which:

FIG. 1 is a section view of the valve of the invention in the normal low cooled oil return position, FIG. 2 is a view similar to FIG. 1 but in a top position for the intake hot oil, FIG. 3 is a similar view of the valves of FIGS. 1 and 2 after removal of the removable frying head, FIG. 4 is a schematical partly sectional view of the assembly showing the interposition of the valve between the reservoir and the frying head.

If we refer first of all to FIG. 4 a frying head 1 can be seen able to be fed extemporaneously with hot oil and to be emptied once the frying operation is finished and a reservoir 18 containing the oil 17 able to be subjected to a pressure F for its admission into the frying head 1, or to a depression −F, for its return into the reservoir 18 by appropriate means such as those described in the French Pat. No. 2.501.491. Heating means, shown schematically at 21, ensure the heating of the oil to the optimum frying temperature. A control valve, generally designated by 19, connects the frying head 1 to reservoir 18. As can be seen valve 19 comprises a flow tube 2 in the upper part of which a frying head 1 is engaged and whose lower part 20 opens freely into the lower part of the reservoir.

If we refer to the FIGS. 1 and 2 the frying head 1 can be seen engaged in the flow tube 2 and bearing on the perforated bottom of a cup valve 3 whose opening is directed downwardly. The frying head 1 is mounted for sliding in tube 2 and it is provided with elastomer seals, not shown, providing the sealing between itself and tube 2. The flow tube 2 has an annular narrowed portion 15 on which the free edge of cup valve 3 bears. A compressed spring 10 is held between the bottom of cup valve 3 and the annular narrowed portion 15. Beyond the annular narrowed portion 15 is situated a second cup valve 4 with perforated bottom, oriented in the same way as cup valve 3. A directional rod 8 is mounted for sliding through bottom 14 of cup valve 3 and its stroke is limited by a nut 13 and a stop 9. To this rod 8 are fixed the bottom of cup valve 4 and a mushroom valve 6.

Below the annular narrowed portion 15, the tube has a series of admission orifices 5 beyond which the wall of the tube 2 is of a smaller thickness. The free edge of mushroom valve 6 is able to come, in relation to the internal wall 12 of tube 2, immediately below the passages 5 and to reduce the passage 7 to the size of an insignificant gap. As can be seen, the lower free end 20 of the flow tube 2 opens at a substantial distance from the zone of admission orifices or openings 5 (FIG. 4).

In the normal position (FIG. 1) under the effect of gravity, rod 8 slides downwards and its stroke is stopped by nut 13 coming into abutment against the bottom of cup valve 3. In this position of the rod, the cup valve 4 is opposite the openings 5 and prevents hot oil from entering the frying head. The cooled oil flows through the holes formed in the perforated bottom 14 of cup valve 3, through passage 11 through the holes formed in the bottom of cup valve 4 and through the space 7 left vacant between the free edge of the mushroom valve 6 and the internal wall of tube 2. This cooled oil can only mix with that contained in the bottom of reservoir 18 into which opens the free end 20 of tube 2 (arrows R FIG. 4).

When oil is to be fed into the frying head, a pressure is exerted on the oil 17 which is driven upwards. In the first moments of this phase, the hot oil in the upper part of the reservoir cannot penetrate through orifices 5 which are closed by cup valve 4; but as soon as the oil in space 16 and subjected to the same pressure, has driven mushroom valve 6 into the position shown in FIG. 2 in the direction of arrow F, passage 7 is reduced to an insignificant gap and the inlet orifices 5 open: the cooled oil can practically no longer penetrate into the frying head whereas the hot oil in the upper part of the reservoir is now free to pass through the orifices 5 to the frying head 1 (arrows A - FIG. 4). It can be seen that thus it is the hot oil which is fed into the frying head 1, the amount of cooled oil able to penetrate also therein being negligible.

The stroke of rod 8 is limited by stop 9 which comes into abutment against the bottom 14 of cup valve 3, the distance between this stop 9 and the mushroom valve 6 being adjusted so that valve 6 comes into exact coincidence with the internal wall 12 of tube 2 immediately below the inlet orifices 5.

When the frying operation is finished, a depression −F is excerted on the valve 6 (FIGS. 1 and 4) which on moving back down again frees the passage 7 whilst cup valve 4 closes off the admission orifices.

It will be understood that on section C (FIG. 4) the fluid flows through the flow tube not only during admission but also during return.

If we now refer to FIG. 3, it can be seen that the frying head 1 has been removed from tube 2. Since no force is exerted on the bottom 14 of cup valve 3, spring 10 expands and moves cup valve 3 away from the annular narrowed portion 15. Thus, cup valve 3 drives rod 8 with cup valve 4 and the mushroom valve 6 which are fixed thereto. The stroke of rod 8 is limited by the bottom of cup valve 4 coming into abutment against the annular narrowed portion 15. Thus, the bottom of the cup valve 4 closes passage 11. Thus the space situated above the annular narrowed portion 15 is completely isolated from the oil feed.

The invention is not limited to the embodiment described and shown. In particular, it could be applied to the flow of a refrigerating liquid which, contrary to the application described, would exchange negative kilo calories with the products to be cooled.

I claim:

1. A flow control valve inserted in a closed circuit for the flow of a fluid likely to be at two different temperatures, said valve comprising: a flow tube having at least one admission orifice for said fluid at its first temperature from a reservoir to a receiver where the temperature variation occurs and at least one return passage for said fluid at its second temperature from the receiver towards the reservoir where an inverse temperature variation occurs, first means adapted to close off the return passage whilst the admission orifice is open, and second means adapted to close off the admission orifice whilst the return passage is open, wherein the flow tube is immersed in the reservoir, wherein the return passage opens out into the reservoir at a substantial distance from the admission orifice whereby no appreciable mixing occurs between the fluid at its first temperature and ready to be admitted into the receiver and the fluid at its second temperature and returned from the receiver, wherein the flow tube includes a common section for both the admission and the return flow, positioned downstream of the admission orifice in the direction of admission of the fluid, wherein said admission orifice is formed in the wall of said flow tube and in that said return passage is formed by a space left vacant between a section of the tube itself and a mobile mushroom valve in the tube and able to cooperate with a narrowed portion of said section for closing said outlet passage, said mushroom valve thus forming said first closure means.

2. The valve according to claim 1, wherein said second closure means is formed by a first sliding cup valve having a perforated bottom, said first cup valve being oriented so that its bottom is always downstream of the fluid admission orifice, seen in the direction of admission of the fluid at its first temperature, and whose peripheral wall is coaxial to said tube, said wall being able to close said admission orifice.

3. Valve according to claim 2 wherein said mushroom valve and said first cup valve are integral with a sliding rod coaxial with said tube, the stroke of said rod being limited by two stops mounted on said rod and situated on each side of a plate able to be held immobile in said tube and which said rod passes through, the rod/first cup valve/mushroom defining a valve assembly occupying, in a normal situation, a position such that the return passage is open whereas the admission orifice is closed and being brought into a position such that the return passage is closed whereas the admission orifice is open under the effect of a pressure F exerted on the mushroom valve in the direction of the narrowed portion of the tube.

4. The valve according to claim 3, wherein the tube is vertical and wherein the return passage is situated lower than the admission orifice, the rod/first cup valve/mushroom valve assembly occupying said normal situation by simple gravity.

5. Valve according to claim 3, wherein the rod/first cup valve/mushroom valve assembly returns to its so called normal situation from its position for closing off the return passage under the effect of a depression $-F$ exerted in the valve in the opposite direction to the force F.

6. The valve according to claim 2 wherein said first closure means includes a plate formed by the perforated bottom of a second cup valve similar to the first one and oriented in the same way, said second cup valve being immobilized against the force of a spring, between an internal annular narrowed portion provided in said tube and a removable piece extractable from the tube.

7. The valve according to claim 6 wherein the second cup valve is mounted for sliding on said rod and in that, in the absence of the extractable removable piece, said spring expands while driving the second cup valve, the rod, the first cup valve and the mushroom valve until the bottom of the first cup valve comes into abutment against said internal annular narrowed portion and closes the central passage left vacant by said narrowed portion.

8. The valve according to claim 6 wherein the extractable removable piece is a cylindrical frying tank sliding in said tube.

9. A flow control valve operable to regulate a fluid flow in two opposite directions comprising:
a flow tube having a pair of ends, a restricted flow passage disposed between the ends, at least one lateral opening between the restricted passage and one end, and a radially enlarged portion adjacent the one end;
a valve assembly positioned within the flow tube, and having:
a valve rod passing through the restricted flow passage and having a pair of ends,
a first valve element slidably mounted on the valve rod between a pair of limit stops disposed adjacent one of the valve rod ends,
a second valve element fixed to the valve rod at the second valve rod end,
a third valve element fixed to the valve rod between the restricted flow passage and the second valve rod end,
the first valve element being resiliently biased to a first position where the valve rod causes the second valve element to close the restricted flow passage, and being movable to a second position where, in response to a fluid pressure increase in the one end of the flow tube, the third valve element cooperates with the flow tube to restrict flow from the one end of the flow tube but the second valve element permits flow through the at least one orifice, and where, in response to a fluid pressure decrease in the one end of the flow tube, the second valve element restricts flow through the at least one orifice but the third valve element permits flow through the one end of the flow tube.

10. The flow valve of claim 9 wherein the first valve element is a cup valve with a base, the base having at least one opening to permit flow therethrough.

11. The flow valve of claim 9 wherein the second valve element is a cup valve with a base, the base having at least one opening therethrough, the opening being disposed to restrict fluid flow through the restricted flow passage of the flow tube when the second valve element is next to the restricted flow passage.

12. The flow valve of claim 9 wherein the third valve element is a mushroom valve.

* * * * *